Patented Jan. 15, 1924.

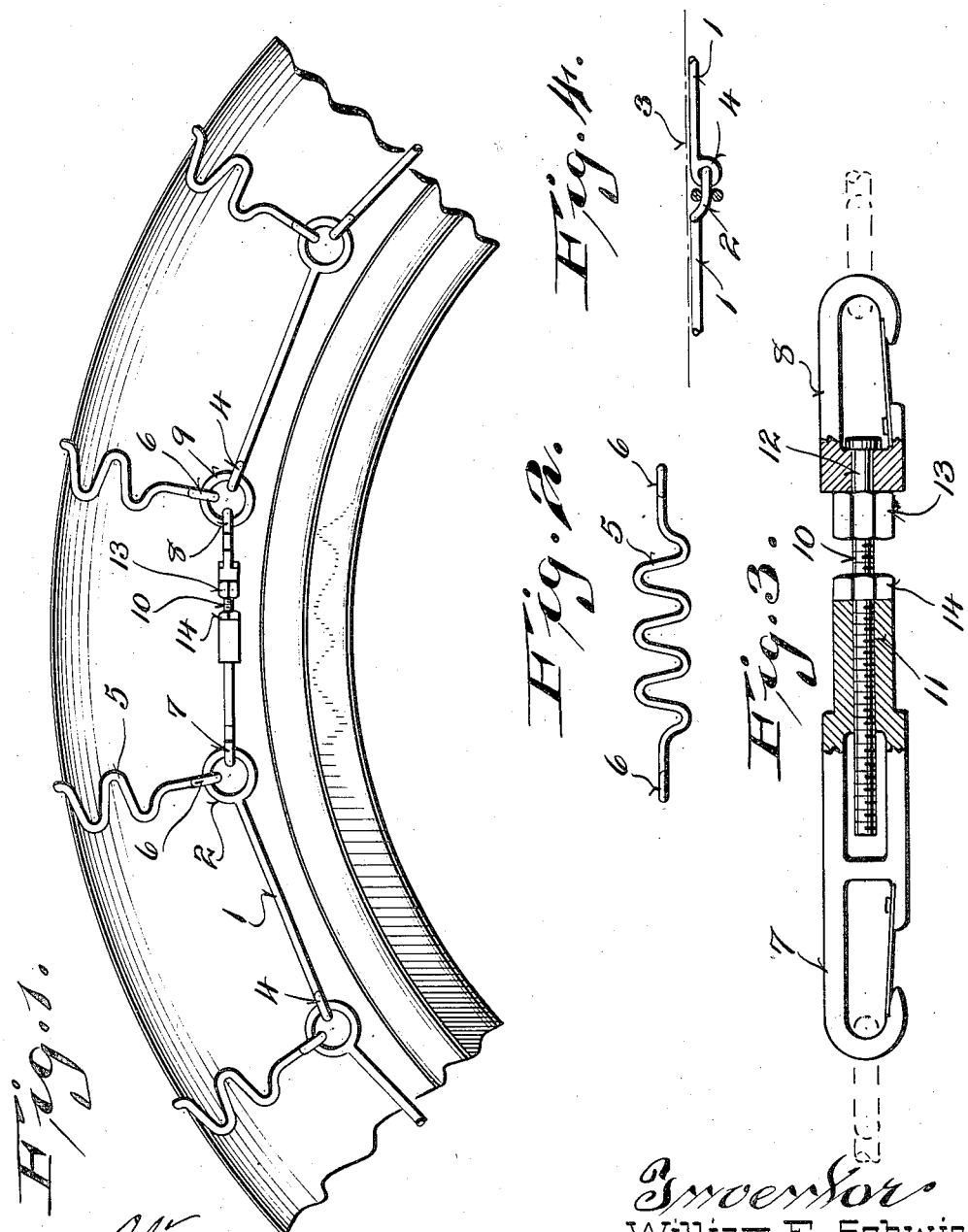

1,481,232

UNITED STATES PATENT OFFICE.

WILLIAM F. SCHWIESOW, OF RIPON, WISCONSIN.

NONSKID CHAIN FOR AUTO WHEELS.

Application filed February 9, 1923. Serial No. 617,927.

*To all whom it may concern:*

Be it known that I, WILLIAM F. SCHWIE-SOW, a citizen of the United States, and resident of Ripon, in the county of Fond du Lac and State of Wisconsin, have invented certain new and useful Improvements in Nonskid Chains for Auto Wheels; and I do hereby declare that the following is a full, clear, and exact description thereof.

This invention relates to non-skid chains for automobile tires.

Objects of this invention are to provide a tire chain in which the individual links of the chain lie flat upon the tire and do not have any portion projecting into and indenting the tire, in which the desired adjustment for tightening the side chains may be made while such side chains are in place, in which the parts most subject to wear may be easily and cheaply replaced, and in which a minimum number of joints are formed.

An embodiment of the invention is shown in the accompanying drawings, in which—

Figure 1 is a side elevation of a tire, showing the non-skid chain in position thereon.

Figure 2 is a view showing one of the lags laid out straight.

Figure 3 is an enlarged view of the adjustable coupling for tightening the chains, such view being partly in section.

Figure 4 is a detail of the joint between successive links of the side chains.

Referring more particularly to the drawings, it will be seen that the non-skid chain comprises a pair of side chains which may be duplicates, each formed of a plurality of links having an elongated body portion 1, with a flat eyelet 2 of relatively large extent, formed at one end thereof and slightly spaced from the side plane 3 of the tire, as may be clearly seen from Figures 1 and 4. The other end of each of the links is provided with a relatively smaller eyelet 4, which is turned at right angles to the plane of the link and projects laterally outwardly from the plane of the tire, as may be seen from Figure 4. These links form, in effect, side bars, which are joined in such a manner that no portion projects into or indents the side of the tire. Each of the eyelets 2 carries one end of the lags 5, such lags extending transversely of the tire from one side chain to the other, lying flat upon the tire and curving to conform to the curvature of the tire. It will be noted from an inspection of Figure 2 that these lags 5 are formed preferably from relatively stiff wire and are transversely crimped and provided with attaching eyelets 6, which may readily engage the eyes 2. These attaching eyes 6, as may be seen from Figure 4, also are spaced from the side plane of the tire and do not indent the tire.

It is particularly to be noted that a minimum of joints are formed by this construction and that the portions receiving the greatest wear, that is to say, the lags 5, are the most cheaply formed part of the non-skid chain, as they may be made from a single piece of crimped relatively stiff wire and may, therefore, be readily replaced at a minimum of expense.

In order to provide for the tightening or adjustment of the side chains, a tightening member consisting essentially of two snap fasteners 7 and 8, is interposed in the side chains. The snap fasteners 7 and 8 are adapted to hook, respectively, into terminal eyelet 2, and into a ring 9 passed through the relatively smaller terminal eyelet 4, as may be seen from Figure 1. The snap fasteners are joined by an adjusting bolt 10, which is threaded into an elongated portion 11 of the snap fastener 7 and which is swivelly joined to the snap fastener 8 by the cylindrical headed portion 12 of the bolt. A nut 13 may be secured to the bolt in any suitable manner, or may be formed integral therewith so as to provide readily accessible means for either holding the body still while the nut 14 is rotated or for rotating such body portion. A lock nut 14 is threaded upon the bolt and bears upon the face of the elongated portion 11.

This type of tightener is particularly advantageous for use in side chains, as it may be readily attached at each end to the chains, and as it may be most readily adjusted without removing it from the chains, due to the swivel and threaded connection of the bolt with the respective snap fasteners.

It will be seen that a non-skid chain has been provided in which the portions of the chain lie flat upon the surface of the tire and do not indent the tire or unduly abrade it. It will also be seen that a minimum of joints are provided, and that consequently the danger of wearing through at the joints is materially reduced.

It is to be noted that the transverse lags are single unitary members and are not joined. This construction minimizes wear as there are no sliding joints between the parts of the lags. Further it will be seen that the crimping of these lags is such as to produce widely open V-shaped crimps. This formation prevents the catching of weeds, grass and trash generally in the crimps, as would be the case where the sides contract or approach closely to each other.

It is to be understood that although one specific form of the invention has been described in considerable detail, the invention may take various forms and is to be limited only as set forth in the appended claim.

I claim:

A non-skid tire chain, comprising a pair of side chains adapted to be positioned upon opposite sides of a tire, and a series of lags joining said side chains and passing transversely over said tire, said side chains each comprising a series of links having flat eyelets at one end adapted to roughly parallel the sides of the tire and each being slightly spaced from the plane of the body portion of the corresponding link and having smaller eyelets at the other end turned at right angles to the plane of said flat eyelets and interlinked therewith and projecting outwardly from the plane of said links.

In testimony that I claim the foregoing I have hereunto set my hand at Ripon, in the county of Fond du Lac, and State of Wisconsin.

WILLIAM F. SCHWIESOW.